Nov. 25, 1969  K. PRESTON, JR  3,480,348

APPARATUS FOR USE IN PHASE MODULATING A BEAM OF LIGHT

Filed Dec. 16, 1964

INVENTOR.
KENDALL PRESTON, JR.
BY
Edward R. Hyde Jr.
ATTORNEY.

United States Patent Office 3,480,348
Patented Nov. 25, 1969

3,480,348
APPARATUS FOR USE IN PHASE MODULATING A BEAM OF LIGHT
Kendall Preston, Jr., New Haven, Conn., assignor to The Perkin-Elmer Corporation, Norwalk, Conn., a corporation of New York
Filed Dec. 16, 1964, Ser. No. 418,701
Int. Cl. G02f 1/16
U.S. Cl. 350—161                                  10 Claims

ABSTRACT OF THE DISCLOSURE

An apparatus for use in modulating the phase of a beam of light. A layer of piezo crystal material having a reflective coating on one side is excited by means of a recording tape having field producing particles arranged in a pattern. Because of the pattern arrangement, certain portions of the layer change in thickness more than other portions. This causes changes in the contour of the reflective coating. In use, a beam of light is directed toward the reflective coating. Due to the contour changes the reflected beam is phase modulated.

---

Figure 1:
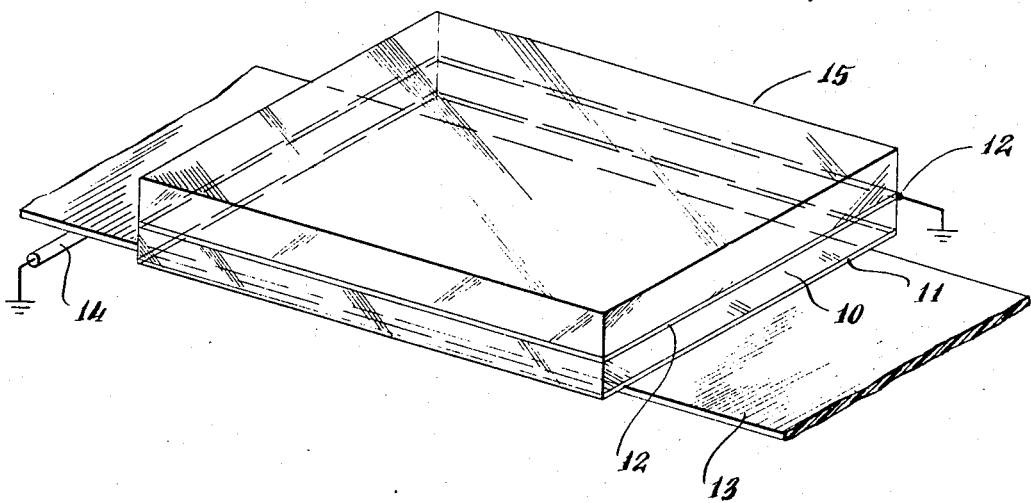

The present invention relates to an optical phase modulator of the type wherein a reflecting surface is selectively altered so as to change the phase of a beam of light incident upon the surface.

Optical phase modulators find particular application in display or indicator systems. In one well known modulator the modulating signal is supplied to an electron beam gun which scans an oil surface or film. As the electron beam passes over the oil film the thickness of the film is altered by an amount dependent upon the magnitude of the electron beam which in turn is controlled by the modulating signal. As the film thickness varies the optical path length through the film varies, thus imparting the modulation information to a light beam incident upon the film.

Because this system uses an oil film it has certain inherent disadvantages and undesirable characteristics. The oil is apt to become contaminated after a period of time and when this happens the oil obviously cannot perform its intended function. This contamination also affects other portions of the system such as the electron beam gun to which the oil particles eventually migrate.

A number of techniques have been suggested to overcome the problems associated with the system just described. One involves the use of a reflective and conductive membrane of parabolic shape supported at its periphery by a ring. A plurality of conductor elements either of pie shape or concentric rings configuration is located below the membrane. Each conductor element is intended to be associated with a particular sector of the membrane. As energizing potentials are applied between the membrane and selected conductor elements, the sectors of the membrane associated with the selected elements are deflected. It has been found, however, that other sectors of the membrane are also deflected to some extent because the various sectors of the membrane are not isolated from each other. This cross-talk effect is obviously undesirable since it results in improper deflection which, in turn, causes improper modulation information to be imparted to a light beam incident upon the membrane.

Another modulation technique which overcomes the problems associated with both the oil film system and the parabolic membrane reflector uses a plurality of individual reflecting elements. Each reflecting element has associated with it a transducer to which the modulation information is supplied. The transducer movement controls the position of the reflecting element. It is apparent that this modulation technique provides localized operation in that the various transducers and reflecting elements are isolated. The resolution of such a system is limited only by the size of the individual reflecting elements and transducers. While the limitations and disadvantages of the oil film and parabolic membrane reflector modulators are overcome by using a plurality of reflecting elements, it has been found that a complete and operative system based upon this technique is extremely expensive to fabricate since the individual reflector elements and transducers are very costly.

It is, therefore, an object of the present invention to provide a new and improved optical phase modulator.

It is another object of the present invention to provide an optical phase modulator which is simple in construction and inexpensive to fabricate.

It is a further object of the present invention to provide an optical phase modulator wherein the various sectors of the reflecting surface are isolated from one another.

It is a still further object of the present invention to provide a new and improved optical phase modulator which is reliable and not subject to an unusually short lifetime.

An optical phase modulator constructed in accordance with the present invention includes a piezo crystal layer and a reflective ioating on the piezo crystal layer. This optical phase modulator also includes means for applying potential differences across selected portions of said piezo crystal layer to individually alter the disposition of selected portions of the reflective coating.

For a better understanding of the present invention, together with other and further objects thereof, reference is had to the following description, taken in connection with the accompanying drawings and its scope will be pointed out in the appended claims.

Figure 2:
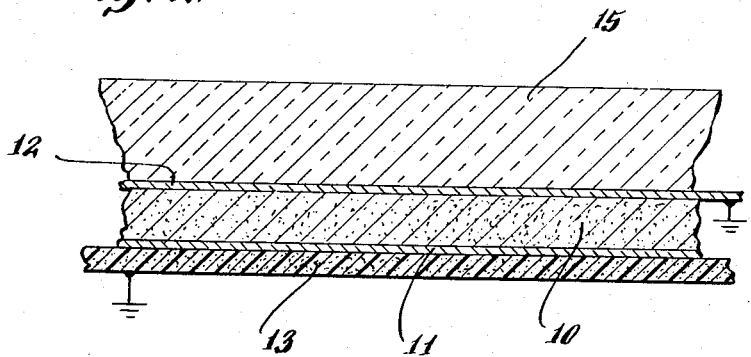

Referring to the drawings:

FIGURE 1 shows one embodiment of an optical phase modulator constructed in accordance with the present invention; and FIGURE 2 is a cross-section view of the optical phase modolator of FIGURE 1.

DESCRIPTION AND OPERATION OF THE INVENTION

Referring to FIGURES 1 and 2, wherein similar elements have been given the same reference numerals, an optical phase modulator constructed in accordance with the present invention includes a piezo crystal layer 10. Layer 10 may be either of a piezoelectric material or a piezomagnetic (magnetostrictive) material.

The invention also includes a reflective coating 11 on the piezo crystal layer 10, and may include a conductive coating 12 also on the piezo crystal layer. For the embodiment of the invention shown in FIGURE 1 the conductive coating 12 is on the opposite surface of the piezo crystal layer 10 from the reflective coating 11. Since a beam of light to be modulated would approach the modulator from above, the conductive coating 12 for this embodiment must necessarily be transparent. The piezo crystal layer 10 must, for the same reason, be transparent. As indicated in the drawing, conductive coating 12 is grounded.

The invention further includes means for applying potential differences across selected portions of the piezo crystal layer 10 to individually alter the disposition of selected portions of the reflective coating 11. This is accomplished by varying the point to point elevation of the reflective coating 11. Changes in elevation of the reflective coating 11 are produced either by the action of an electric field upon layer 10 when layer 10 is a layer of piezoelectric material or a magnetic field upon layer 10 when layer 10 is a layer of piezomagnetic material. The application of such fields to the layer 10 causes vibrations in the thickness of the layer in the usual manner.

The particular technique utilized for causing such variations in the thickness of layer 10 involves the use of a length of recording tape 13 positioned adjacent the reflective coating 11 at the opposite surface from layer 10. Recording tape 13 has field producing particles arranged in a pattern according to the particular modulation information recorded on the tape by recorder which is not shown. When a piezoelectric material is used for layer 10, recording tape 10 is a dielectric tape containing a pattern of electrical charges. On the other hand, when a piezomagnetic material is used for layer 10, the recording tape 13 is a magnetic tape having a pattern of magnetic charges. The backing or undersurface of the recording tape 13 is grounded as represented by the grounding of a roller 14.

As the recording tape 13 is moved to its appropriate position the pattern of field producing particles is positioned beneath the piezo crystal layer 10. This creates potential differences across layer 10 between the transparent conductive coating 12 and the top surface of recording tape 13. The potential differences, in turn, cause variations in the thickness of layer 10 which in turn alter the disposition of the reflective coating 11 on the layer 10 thus modulating the phase of the light reflected from coating 11. It should be pointed out that conductive coating 12 is unnecessary for satisfactory operation but its inclusion offers an improvement in that it enhances the penetration of the field produced by the pattern of particles on the recording tape 13.

The invention preferably includes a transparent substrate 15. Substrate 15, providing support for the modulator, may be fabricated of conventional glass.

While there has been described what are at present considered to be the preferred embodiments of this invention, it will be obvious to those skilled in the art that various changes and modifications may be made therein without departing from the invention and it is, therefore, aimed to cover all such changes and modifications as may fall within the true spirit and scope of the invention. For example, various changes may be made to the arrangement of layer 10, coatings 11 and 12 and substrate 15. In certain of these arrangements, the reflective coating 11 and the conductive coating 12 may be adjacent to one another. In this case a single coating having both reflecting and conducting properties may be used instead of two separate coatings.

I claim:
1. Apparatus for use in phase modulating a beam of light comprising:
    (a) a piezo crystal layer changeable in thickness when excited, the amount of the change in thickness being dependent on the amount of the excitation;
    (b) a reflecitve coating on one side of said layer; and
    (c) means for exciting different portions of said layer by different amounts so as to cause changes in the contour of the reflective coating;
whereby a beam of light incident on said reflective coating will on reflection be phase modulated according to the changes in the contour of said reflective coating.

2. The apparatus according to claim 1, and wherein said means for exciting said layer includes a length of recording tape, said recording tape containing field producing particles for exciting said piezo crystal, said field producing particles being arranged in a pattern so that the intensity of the field produced thereby is different at different locations.

3. The apparatus according to claim 2 and wherein said recording tape is disposed along one side of said layer.

4. The apparatus according to claim 3 and wherein said recording tape is mounted for movement along one side of said layer.

5. The apparatus according to claim 3 and further including a conductive coating on said layer on the side opposite the side nearest said recording tape.

6. The apparatus according to claim 3 and further including a substrate for supporting said layer and said coating.

7. The apparatus according to claim 3 and wherein said piezo crystal is piezoelectric, said recording tape is a dielectric material and field producing particles are electric charges.

8. The apparatus according to claim 3 and wherein said piezo crystal is piezomagnetic, said recording tape is a magnetic tape and the field producing particles are magnetic charges.

9. Apparatus for use in modulating the phase of a beam of light comprising:
    (a) a layer of piezo crystal material changeable in thickness in response to an applied field;
    (b) a reflective coating formed on the bottom side of said layer;
    (c) a transparent substrate on top of said layer for supporting said layer; and
    (d) a length of recording tape disposed along the bottom side of said layer, said recording tape having field producing particles arranged in a pattern so as to produce a field of nonuniform intensity through said piezo crystal layer, causing different portions of said layer to change in thickness by different amounts and hence alter the contour of said reflective coating,
whereby a beam of light passing through said substrate and said layer and reflected off said reflective coating will be spatially phase modulated according to the changes in the contour of said reflective coating.

10. The invention according to claim 9 and further including a conductive coating formed on the top side of said layer for enhancing the penetration of said field through said layer.

References Cited
UNITED STATES PATENTS 3,330,957   7/1967   Runnels _____ 350—150

RONALD L. WIBERT, Primary Examiner

WILLIAM L. SIKES, Assistant Examiner

U.S. Cl. X.R.

350—295